United States Patent [19]
Hosono et al.

[11] 3,818,503
[45] June 18, 1974

[54] ROTARY HEAD TYPE MAGNETIC RECORDING AND REPRODUCING APPARATUS

[75] Inventors: Hiroo Hosono, Hirakata; Michinori Nagahiro, Nishinomiya, both of Japan

[73] Assignee: Matsushita Electric Industrial Co., Ltd., Osaka, Japan

[22] Filed: Nov. 30, 1972

[21] Appl. No.: 310,965

[30] Foreign Application Priority Data

| | | |
|---|---|---|
| Dec. 1, 1971 | Japan | 46-97370 |
| Dec. 1, 1971 | Japan | 47-77222 |
| Sept. 4, 1972 | Japan | 47-88969 |

[52] U.S. Cl. .................................. 360/85, 360/130
[51] Int. Cl. .................................. G11b 5/52
[58] Field of Search .............. 179/100.2 T, 100.2 A

[56] References Cited

UNITED STATES PATENTS

| | | | |
|---|---|---|---|
| 3,150,840 | 9/1964 | Briskin et al. | 242/195 |
| 3,388,221 | 6/1968 | Johnson et al. | 179/100.2 T |
| 3,598,926 | 8/1971 | Umeda | 179/100.2 T |
| 3,740,495 | 6/1973 | Kihard | 179/100.2 T |

*Primary Examiner*—Harry N. Haroian
*Assistant Examiner*—John W. Shepperd
*Attorney, Agent, or Firm*—Stevens, Davis, Miller & Mosher

[57] ABSTRACT

A rotary head type magnetic recording and reproducing apparatus, in which a magnetic tape paid out from a supply reel is trailed around a guide drum having a plurality of rotary heads therein, over a predetermined central angle of said guide drum in such a manner that said magnetic tape may be positioned on a continuous line made up of a curved line having its center on the magnetic coating side of said magnetic tape, and straight lines, and is led to a winding reel in such a manner that the tape leading to the guide drum and the tape leaving said guide drum cross each other at a point remote from said guide drum, whereby travel of the tape is stabilized.

3 Claims, 7 Drawing Figures

ROTARY HEAD TYPE MAGNETIC RECORDING AND REPRODUCING APPARATUS

This invention relates to a rotary head type magnetic recording and reproducing apparatus and employing a helical scanning method in which a magnetic tape is driven in engagement with a predetermined circumferential length of a cylindrical guide drum having rotary heads therein. More particularly, the invention relates to a magnetic recording and reproducing apparatus of the type described, which is so constructed that a magnetic tape paid out from a supply reel may be driven stably along a predetermined path and automatically taken up on a winding reel, or in other words, the so-called auto-threading may be easily achieved.

In a conventional magnetic recording and reproducing apparatus employing a 2-head helical scanning method, a magnetic tape is bent in the shape of Ω at a cylindrical guide drum. Therefore, attempt is made to employ the auto-threading method in the conventional apparatus having such tape driving system, the apparatus will have a construction as shown in FIG. 6.

Namely, a tape paid out from a supply reel 1 is bent sharply by a first guide pin 4 near a tape passage opening 3 of a cartridge 2 in which said supply reel 1 is contained, trailed along a second guide pin 5 and an erasing head 6, bent at about 90° by a third guide pin 7, trailed around a cylindrical guide drum 10 having rotary magnetic heads 8, 9 therein over an angle of about 180°, again bent at about 90° by a fourth guide pin 7', trailed along an audio control head 11 and a capstan 12, and led to a winding reel 13. In FIG. 6, reference numeral 14 designates a pinch roller and 15 designates guide plates for guiding a leader tape, provided at the leading end of the magnetic tape, along a predetermined path.

With such a construction, the leader tape at the start of auto-threading travels while being bent alternatively in opposite directions, so that much difficulty will be encountered in guiding the leader tape, and further, the free end of the leader tape will about against the heads 6, 11 and guide pin 5 and, on some occasions, driving of the tape will become impossible. Furthermore, the guide plates are not continuous but form gaps between each other, so that it is possible for the leader tape end to go out of the predetermined tape path through said gaps.

A primary object of the invention, therefore, is to provide a rotary head type magnetic recording and reproducing apparatus which obviates such disadvantages and in which a leader tape paid out from a supply reel is driven on a continuous line made up of a curved line having its center on one side of said leader tape, and straight lines, and is led to a winding reel, so as to ensure that auto-threading of the tape is achieved positively.

Another object of the invention is to provide a rotary head type magnetic recording and reproducing apparatus of the character described, in which is used a continuous seamless leader tape guide.

Still another object of the invention is to provide a rotary head type magnetic recording and reproducing apparatus of the character described, which is so constructed that a magnetic tape may be smoothly engaged around a guide drum having rotary heads therein, so as to ensure stable running of the tape during recording or reproducing operation.

Still another object of the invention is to provide a rotary head type magnetic recording and reproducing apparatus of the character described, in which the tape leading to the guide drum and the tape leaving said guide drum are bent only inwardly of said guide drum, whereby it becomes possible to arrange close to said guide drum such elements as guide pins, a capstan, an audio control head and an erasing head, which are positionally closely related with said guide drum, and thereby to maintain the relative position of said elements with high accuracy.

Still another object of the invention is to provide a rotary head type magnetic recording and reproducing apparatus of the character described, which is so constructed that the magnetic heads and tape guide pins will be in contact only with the magnetic coating of the tape during recording and reproducing operations, so as to avoid instable travel of the tape otherwise caused by friction between the non-coated face of the tape and the guide posts, etc.

A further object of the invention is to provide a rotary head type magnetic recording and reproducing apparatus of the character described, which is so constructed that the leader tape will be guided smoothly by a leader tape guide.

An additional object of the invention is to provide a rotary head type magnetic recording and reproducing apparatus of the character described, which can be reduced in size.

Other objects and features of the invention will become apparent from the following detailed description taken in conjunction with the accompanying drawings, in which:

FIG. 5(*b*) is a plan view of the portion shown in FIG. 5(*a*); and

Figure 1:
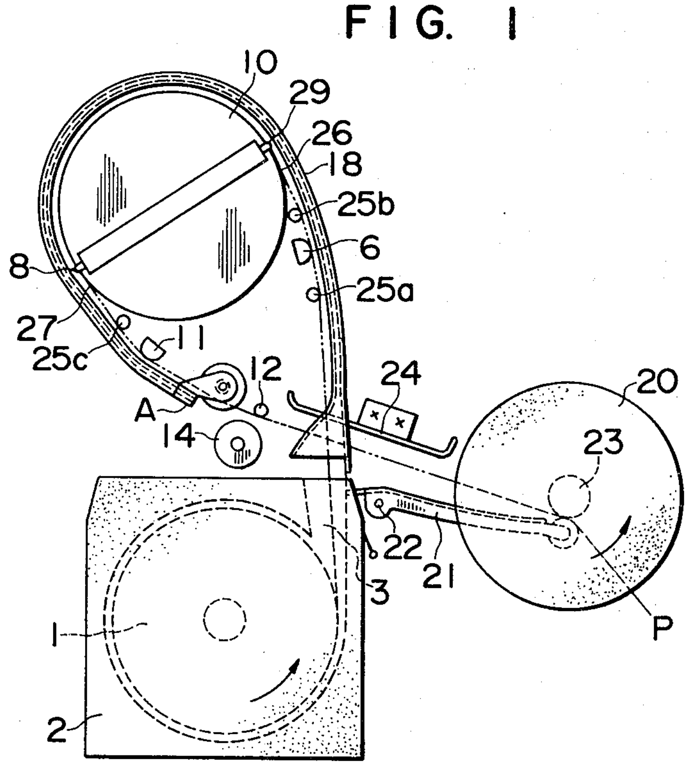
FIG. 1 is a plan view showing one embodiment of the present invention.
Figure 2:
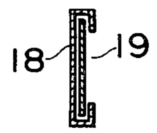
FIG. 2 is a sectional view an essential component parts of the apparatus shown in FIG. 1.
Figure 3:
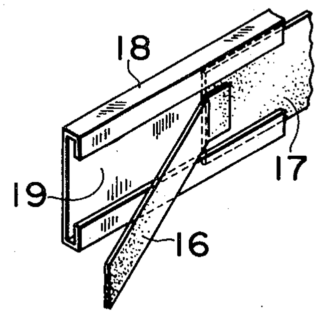
FIG. 3 is a perspective view of the parts shown in FIG. 2.

With reference to FIGS. 1 – 4 of the drawings, a cartridge 2 has disposed therein a supply reel 1 in which a magnetic tape 16 and a leader tape 17 connected to the leading end of said magnetic tape are wound, said leader tape 17 being slightly wider in width and more rigid than said magnetic tape. The cartridge 2 has a tape passage opening 3 at a portion thereof, through which the tape is paid out from or taken in said cartridge. A leader tape guide 18, as shown in FIG. 2, has at one side a longitudinal opening 19 of a width larger than the width of the magnetic tape 16 but smaller than the width of the leader tape 17, and is arranged in a substantially elliptical shape, essentially along a tape running path extending around a cylindrical guide drum 10 having rotary heads 8, 9 therein, with one end located adjacent the tape passage opening 3 of the cartridge 2, as seen in the plan view of FIG. 1.

A winding reel 20 is arranged in the position shown in FIG. 1 and a winding lever 21 is provided, with one end thereof pivotally mounted on a pin 22 and the other end in pressure contact with a hub 23 of said winding reel 20. As seen in FIG. 1, the arrangement of the winding reel 20 and the winding lever 21 is such that the line connecting the point p of pressure contact between the hub 23 and said winding lever, with the other end A of the leader tape guide 18, will be a substantially straight line.

Namely, the leader tape 17 paid out from the tape passage opening 3 passes in the leader tape guide 18 and moves out of said leader tape guide from its end A. Thereafter, the leader tape 17 passes below the leader tape guide 18 and reaches the point P of pressure contact between the hub 23 of the winding reel 20 and the winding lever 21, while being guided by a guide plate 24 and said winding lever 21, to be successively automatically wound up in said winding reel by conventionally known means.

As the leader tape 17 is thus wound up, the magnetic tape 16 is led into the leader tape guide 18 but, because of its narrow width, it is successively moved out of said leader tape guide through the opening 19 and engaged around the guide drum 10 over a predetermined central angle (about 180° in case of the two-head guide drum) of said guide drum as indicated by the alternate long and two short dashes lines in FIG. 1. Thus, recording or reproduction of the magnetic tape is carried out by the rotary head 8 or 9.

Reference numerals 25*a*, 25*b*, 25*c* designate guide pins for guiding the magnetic tape 16 moving out of the leader tape guide 18, 6 an erasing head, 11 an audio control head, 12 a capstan and 14 a pinch roller. An arrangement is made such that the capstan 12 and pinch roller 14 are held in pressure contact with each other only during recording or reproducing operation.

Figure 4:
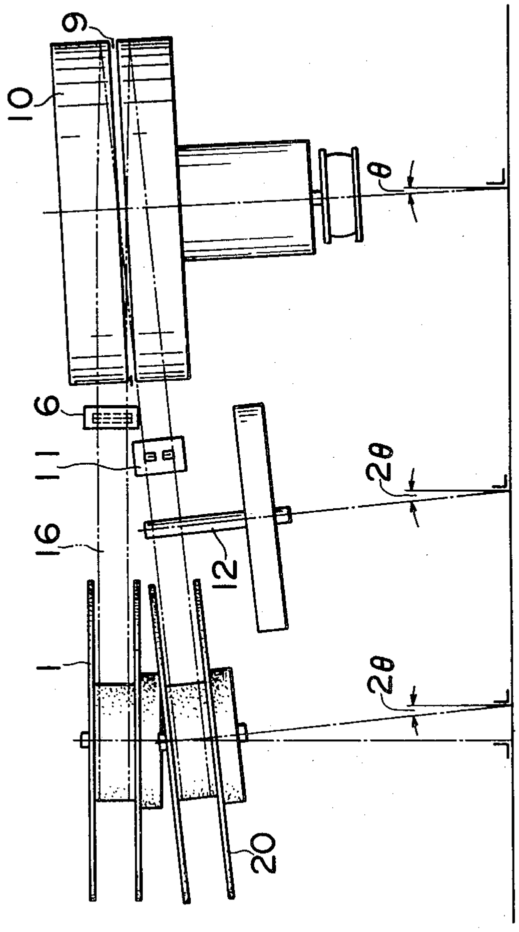
FIG. 4 is a schematic side view showing the arrangement of the essential portion of the apparatus.

FIG. 4 shows the angular positional relation of the supply reel 1, the guide drum 10 and the winding reel 20. As shown, the magnetic tape 16 paid out from the supply reel 1 runs parallel to the flanges of said supply reel (parallel to the base panel of the apparatus) and is engaged around the outer periphery of the cylindrical guide drum 10 over at least a central angle of 180° of said guide drum.

This guide drum 10 is inclined at an angle $\theta$ relative to the base panel of the apparatus in a direction perpendicular to the line connecting a point 26 at which the magnetic tape 16 first engages the guide drum, with a point 27 at which said magnetic tape disengages from said guide drum. The length of tape between the supply reel 1 and the guide drum 10, and the length of tape between said guide drum 10 and the winding reel 20 cross each other at a point on or adjacent an extension of the guide drum diameter extending in the inclining direction of said guide drum.

Therefore, the direction of the magnetic tape 16 is gradually changed during running along the peripheral surface, between the points 26 and 27, of the guide drum 10 and, at the point 27, the tape is inclined at an angle $2\theta$ relative to the base panel of the apparatus and driven by the capstan and the cooperating pinch roller, which are also inclined at an angle $2\theta$ relative to said base panel, to be taken up by the winding reel 20 which is also inclined at an angle $2\theta$ relative to said base panel.

The guide pins 25*a*, 25*b* and the erasing head 6 are at right angles to, and the guide pin 25*c* and the capstan 12 are inclined at an angle $2\theta$ to the base panel of the apparatus, respectively, so that they may be in contact squarely with the magnetic tape.

Figure 5A:
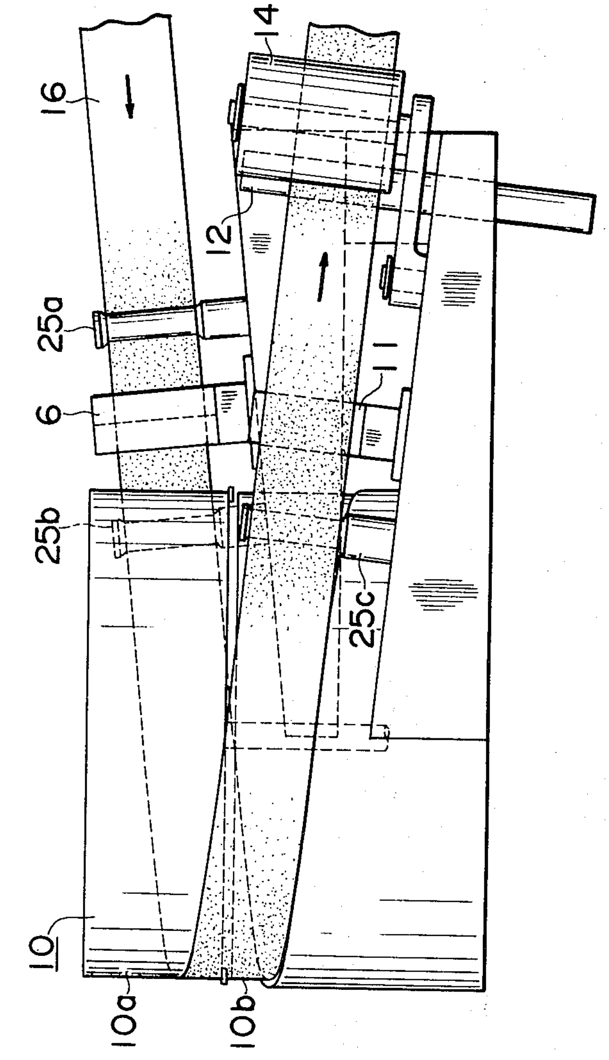
FIG. 5(*a*) is a side view showing in detail a portion of the arrangement shown in FIG. 4.
Figure 5B:
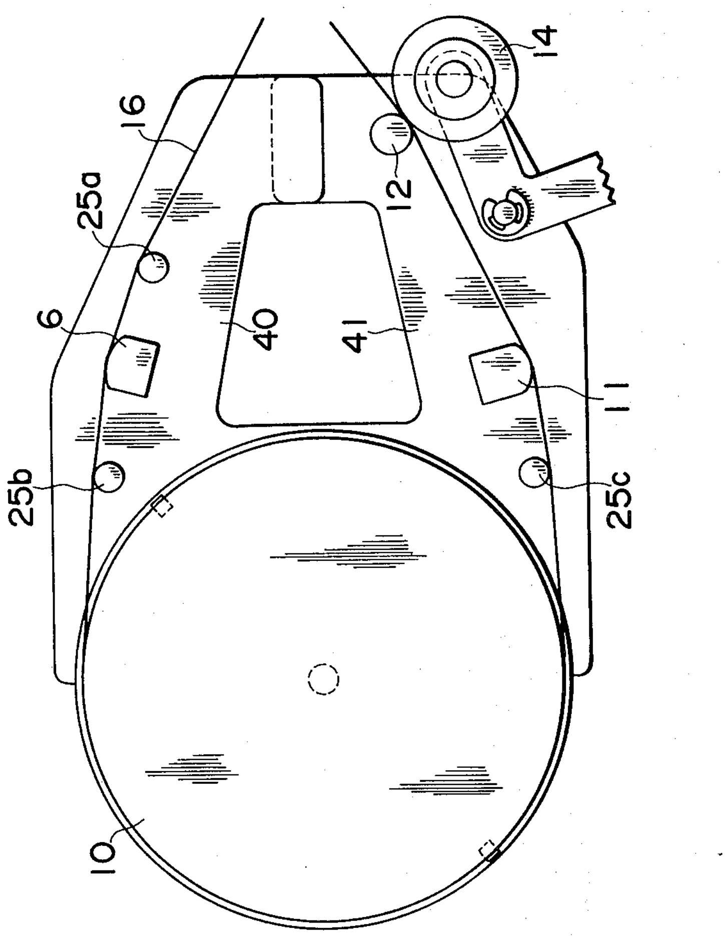
Figure 6:
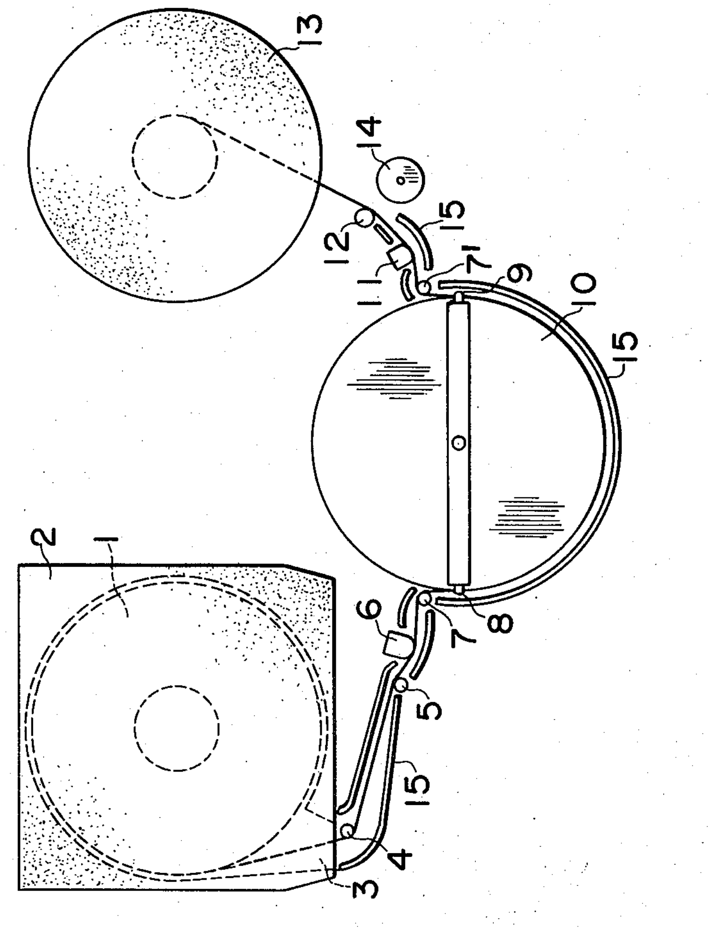
FIG. 6 is a plan view of a conventional apparatus.

FIGS. 5(*a*) and 5(*b*) exemplify a practical arrangement of the rotary head type magnetic recording and reproducing apparatus according to the invention, at a portion near the guide drum 10. The guide drum 10 is composed of separate upper guide drum unit 10*a* and lower guide drum unit 10*b*. The lower guide drum unit 10*b* has arms 40 and 41 formed integrally therewith, said arm 40 extending in the same direction as the direction of the magnetic tape 16 running toward the guide drum 10 to be engaged therearound and having a surface A at right angles to the edges of said tape, and said arm 41 having a surface B at right angles to the edges of the magnetic tape 16 leaving said guide drum 10.

On the surface A of the arm 40 are provided the guide pins 25*a*, 25*b* and the erasing head 6 at right angles thereto, while on the surface B of the arm 41 are provided the guide pin 25*c*, the audio control head 11 and the capstan 12 at right angles thereto.

As may be understood from the foregoing description, according to the invention the magnetic tape paid out from the supply reel, before it is taken up by the winding reel, is always bent only in the direction in which the magnetic coating faces, and is engaged around the peripheral surface of the guide drum over a central angle of about 180° of said guide drum, and further the tape leading to the guide drum and the tape leaving said guide drum cross each other at a point on or adjacent an extension of the guide drum diameter extending in the direction of inclination of said guide drum. Therefore, the number of bends of the tape can be reduced to a necessary minimum and the tape passing around the guide drum is not bent in the widthwise direction, with the result that stable travel of the tape can be obtained. The leader tape travels in the leader tape guide, also in substantially the same direction and at substantially the same curvature as the magnetic tape, smoothly though it is somewhat more rigid than the magnetic tape, ensuring stable autothreading.

Further, since the path of tape is so arranged that the tape leading to the guide drum and the tape leaving said guide drum cross each other at a point on or adjacent an extension of the guide drum diameter extending in the same direction as the direction of inclination of said guide drum, the size of the substantially elliptical shape defined by the leader tape guide 18 can be reduced to the smallest possible size and hence the size of the apparatus can be reduced accordingly. Furthermore, since all of the magnetic heads, the tape guide pins, etc. can be arranged such that they will contact only the magnetic coating side of the magnetic tape, instable travel of tape can be avoided which would otherwise tend to occur due to stick-slip caused by friction between the non-coated surface of the tape and the guide pins, etc.

It is also to be noted that, according to the invention, the reels, the magnetic heads, etc. can be arranged substantially symmetrically with respect to the line including the guide drum diameter extending in the same direction as the direction of inclination of the guide drum, and this also contributes to the reduction in size of the apparatus.

In addition, according to the invention, the guide pins, the erasing head and the audio control head, which regulates the position of the running tape, can be arranged in close relation to each other within the substantially triangular shape defined by a portion of the outer periphery of the guide drum and the point of intersection of the magnetic tape. Therefore, the provision of the associated mechanisms in a compact unitary form can be easily achieved, and the assembly and adjustment thereof are facilitated. Furthermore, the relative position of these elements can be maintained with high accuracy.

What is claimed is:

1. A rotary head type magnetic recording and reproducing apparatus, characterized in that a magnetic tape paid out from a supply reel is trailed around a guide drum having a plurality of rotary heads therein, over a predetermined central angle of said guide drum in such a manner that said magnetic tape may be positioned on a continuous line made up of a curved line having its center on the magnetic coating side of said magnetic tape, and straight lines, and is led to a winding reel in such a manner that the tape leading to the guide drum and the tape leaving said guide drum cross each other at a point remote from said guide drum, and further guide pins, an erasing head and an audio control head are arranged within the shape defined by a portion of the peripheral surface of said guide drum and the lengths of tape between said guide drum and said tape crossing point, for contact with the magnetic coating of the magnetic tape.

2. A rotary head type magnetic recording and reproducing apparatus according to claim 1, wherein said magnetic tape has connected to its leading end a leader tape which is larger in width and greater in rigidity than said magnetic tape, and a strip-like leader tape guide having on one side a longitudinal opening of a width larger than the width of said magnetic tape is arranged adjacent the travelling path of said magnetic tape, with its longitudinal opening facing said travelling path of tape, in such a manner that it extends continuously from a point adjacent the supply reel to the capstan.

3. A rotary head type magnetic recording and reproducing apparatus according to claim 1, wherein said guide drum is inclined relative to the flange surface of said supply reel and said magnetic tape crossing point is located adjacent an extension of the guide drum diameter extending in the same direction as the direction of inclination of said guide drum.

* * * * *